(12) United States Patent
Yu et al.

(10) Patent No.: US 10,740,596 B2
(45) Date of Patent: Aug. 11, 2020

(54) VIDEO SECURITY SYSTEM USING A SIAMESE RECONSTRUCTION CONVOLUTIONAL NEURAL NETWORK FOR POSE-INVARIANT FACE RECOGNITION

(71) Applicant: NEC Laboratories America, Inc., Princeton, NJ (US)

(72) Inventors: Xiang Yu, Mountain View, CA (US); Kihyuk Sohn, Fremont, CA (US); Manmohan Chandraker, Santa Clara, CA (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 15/803,318

(22) Filed: Nov. 3, 2017

(65) Prior Publication Data

US 2018/0130324 A1 May 10, 2018

Related U.S. Application Data

(60) Provisional application No. 62/421,430, filed on Nov. 14, 2016, provisional application No. 62/418,892, filed on Nov. 8, 2016.

(51) Int. Cl.
*G06K 9/00* (2006.01)
*G06K 9/62* (2006.01)
(Continued)

(52) U.S. Cl.
CPC ..... *G06K 9/00295* (2013.01); *G06K 9/00241* (2013.01); *G06K 9/00255* (2013.01); *G06K 9/00275* (2013.01); *G06K 9/00288* (2013.01); *G06K 9/00771* (2013.01); *G06K 9/62* (2013.01); *G06N 3/04* (2013.01); *G06N 3/0454* (2013.01); *G06N 3/08* (2013.01); *G08B 13/19617* (2013.01); *G08B 13/19697* (2013.01)

(58) Field of Classification Search
CPC .......... G06K 9/00295; G06K 9/00241; G06K 9/00275; G06K 9/62; G06K 9/00288; G06K 9/00255; G06K 9/00771; G06N 3/0454; G06N 3/08; G06N 3/04; G08B 13/19697; G08B 13/19617
See application file for complete search history.

(56) References Cited

U.S. PATENT DOCUMENTS

| 7,127,087 B2* | 10/2006 | Huang | G06K 9/00228 382/118 |
| 2015/0125049 A1* | 5/2015 | Taigman | G06K 9/00268 382/118 |

(Continued)

*Primary Examiner* — Tat C Chio
(74) *Attorney, Agent, or Firm* — Joseph Kolodka

(57) ABSTRACT

A computer-implemented method, system, and computer program product is provided for video security. The method includes monitoring an area with a camera. The method also includes capturing, by the camera, live video to provide a live video stream. The method additionally includes detecting and identifying, by a processor using a recognition neural network feeding into a Siamese reconstruction network, a user in the live video stream by employing one or more pose-invariant features. The method further includes controlling, by the processor, an operation of a processor-based machine to change a state of the processor-based machine, responsive to the identified user in the live video stream.

20 Claims, 9 Drawing Sheets

(51) Int. Cl.
*G06N 3/04* (2006.01)
*G06N 3/08* (2006.01)
*G08B 13/196* (2006.01)

(56) References Cited

U.S. PATENT DOCUMENTS

2017/0357877 A1* 12/2017 Lin .................... G06K 9/00228
2018/0012463 A1* 1/2018 Chaudhry ........ G08B 13/19608

* cited by examiner

VIDEO SECURITY SYSTEM USING A SIAMESE RECONSTRUCTION CONVOLUTIONAL NEURAL NETWORK FOR POSE-INVARIANT FACE RECOGNITION

RELATED APPLICATION INFORMATION

This application claims priority to 62/421,430, filed on Nov. 14, 2016, and 62/418,892, filed on Nov. 7, 2016, incorporated herein by reference herein its entirety. This application is related to an application entitled "Siamese Reconstruction Convolutional Neural Network for Pose-Invariant Face Recognition", and which is incorporated by reference herein in its entirety

BACKGROUND

Technical Field

The present invention relates to facial recognition and more to particularly pose-invariant facial recognition using a Siamese reconstruction convolutional neural network.

Description of the Related Art

The human visual system is commendable at recognition across variations in pose, for which two theoretical constructs are preferred. The first postulates invariance based on familiarity where separate view-specific visual representations or templates are learned. The second suggests that structural descriptions are learned from images that specify relations among viewpoint-invariant primitives. Analogously, pose-invariance for face recognition in computer vision also falls into two such categories.

The use of powerful deep neural networks (DNNs) has led to dramatic improvements in recognition accuracy. However, for objects such as faces where minute discrimination is required among a large number of identities, a straightforward implementation is still ineffective when faced with factors of variation such as pose changes. An avenue to address this is by increasing the pose variation in training data. Another approach is to learn a mapping from different view-specific feature spaces to a common feature space through methods such as Canonical Correlation Analysis (CCA). Yet another direction is to ensemble over view-specific recognition modules that approximate the non-linear pose manifold with locally linear intervals.

There are several drawbacks for the above class of approaches. First, conventional datasets including those sourced from the Internet have long-tailed pose distributions. Thus, it is expensive to collect and label data that provides good coverage for all subjects. Second, there are applications for recognition across pose changes where the dataset does not contain such variations, for instance, recognizing an individual in surveillance videos against a dataset of photographs from identification documents. Third, the learned feature space does not provide insights since factors of variation such as identity and pose might still be entangled. Besides the above limitations, view-specific or Multiview methods require extra pose information or images under multiple poses at test time, which may not be available.

SUMMARY

According to an aspect of the present principles, a video security system is provided. The system includes a camera positioned to monitor an area and capture live video to provide a live video stream. The system also includes a security processing system including a processor and memory coupled to the processor. The processing system is programmed to detect and identify, using a recognition neural network feeding into a Siamese reconstruction network, a user in the live video stream by employing one or more pose-invariant features. The processing system is also programmed to control an operation of a processor-based machine to change a state of the processor-based machine, responsive to the identified user in the live video stream.

According to another aspect of the present principles, a computer-implemented method is provided for video security. The method includes monitoring an area with a camera. The method also includes capturing, by the camera, live video to provide a live video stream. The method additionally includes detecting and identifying, by a processor using a recognition neural network feeding into a Siamese reconstruction network, a user in the live video stream by employing one or more pose-invariant features. The method further includes controlling, by the processor, an operation of a processor-based machine to change a state of the processor-based machine, responsive to the identified user in the live video stream.

According to yet another aspect of the present principles, a computer program product having program instructions is provided. The program instructions are executable by a computer to cause the computer to perform a method for video security. The method includes monitoring an area with a camera. The method also includes capturing, by the camera, live video to provide a live video stream. The method additionally includes detecting and identifying, by a processor using a recognition neural network feeding into a Siamese reconstruction network, a user in the live video stream by employing one or more pose-invariant features. The method further includes controlling, by the processor, an operation of a processor-based machine to change a state of the processor-based machine, responsive to the identified user in the live video stream.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In contrast, one embodiment of the present invention learns a feature representation that is invariant to pose and does not require extensive pose coverage in training data. A challenge with pose-invariant representations is that discrimination power of the learned feature is harder to preserve, which is overcome with a holistic approach. First, it is proposed to enhance the diversity of training data with images under various poses (along with pose labels), at no additional labeling expense, by designing a synthesis network. But unlike other works which frontalizes non-frontal faces, the embodiment generates rich pose variations from frontal examples, which leads to advantages in better preservation of details and enrichment rather than normalization of within-subject variations. Next, to achieve a rich feature embedding with good discrimination power, a multi-source multi-task learning framework for identification, pose estimation and landmark localization is employed. By jointly optimizing those three tasks, a rich feature embedding including both identity and non-identity information is learned. But this learned feature is still not guaranteed to be pose-invariant.

To achieve pose invariance, a Siamese network to explicitly disentangle identity and nonidentity components of the learned feature is employed. The network accepts a reference face image in frontal pose and another image under pose variation and extracts features corresponding to the rich embedding learned above. Then, it minimizes the error between two types of reconstructions in feature space. The first is self-reconstruction, where the reference sample's identity feature is combined with its non-identity feature and the second is cross-reconstruction, where the reference sample's non-identity feature is combined with the pose-variant sample's identity feature. This encourages the network to regularize the pose-variant sample's identity feature to be close to that of the reference sample. Thus, nonidentity information is distilled away, leaving a disentangled identity representation for recognition at test time.

There are significant advantages of this approach on both controlled datasets and uncontrolled ones for recognition in-the-wild. In particular, strong improvements are achieved over the state-of-the-art on 300-WLP and MultiPIE datasets. These improvements become increasingly significant as performance is considered under larger pose variations. The utility is demonstrated for each component in the framework, namely synthesis of pose variations, multi-source multi-task learning and disentanglement through reconstruction.

Figure 1:
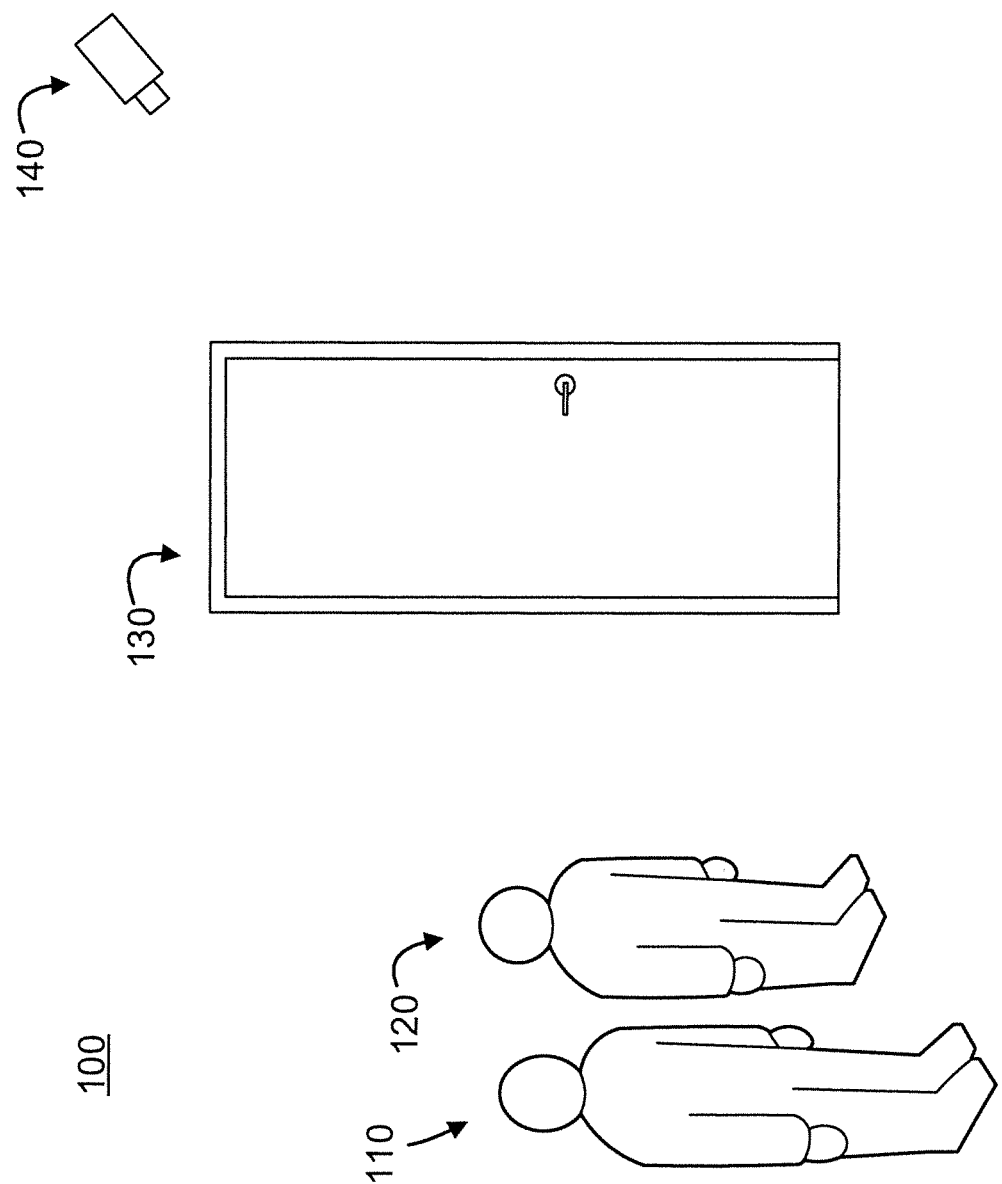
FIG. 1 shows an illustrative diagram of an exemplary environment to which the present invention can be applied, in accordance with an embodiment of the present invention.

The invention as described may be used in many different embodiments. One useful embodiment may have the invention in a video security system. FIG. 1 shows an illustrative diagram of an exemplary environment 100 to which the present invention can be applied, in accordance with an embodiment of the present invention. An office may use the video security system 700 from FIG. 7. The video security system 700 may include a security processing system 710 (not shown) from in FIG. 7. The video security system 700 may deploy one or more cameras 140 (hereafter "camera") in a hallways to monitor the area. The camera 140 will monitor the hall for security purposes. The camera 140 can also be used by a pose-invariant facial recognition method using a Siamese reconstruction convolutional neural network on the security processing system 710. This would allow the video security system 700 to unlock one or more doors 130 (hereafter "door") when a known user 120 approaches the door 130. Though the door 130 does not have an access panel, it will be unlocked by the video security system 700 when the known user 120 approaches the door 130. The security processing system 710 running a pose-invariant facial recognition method using a Siamese reconstruction convolutional neural network will be able to recognize a known user 120 even if the known user 120 is talking to another user 110 and not looking directly into the camera 140.

Figure 2:
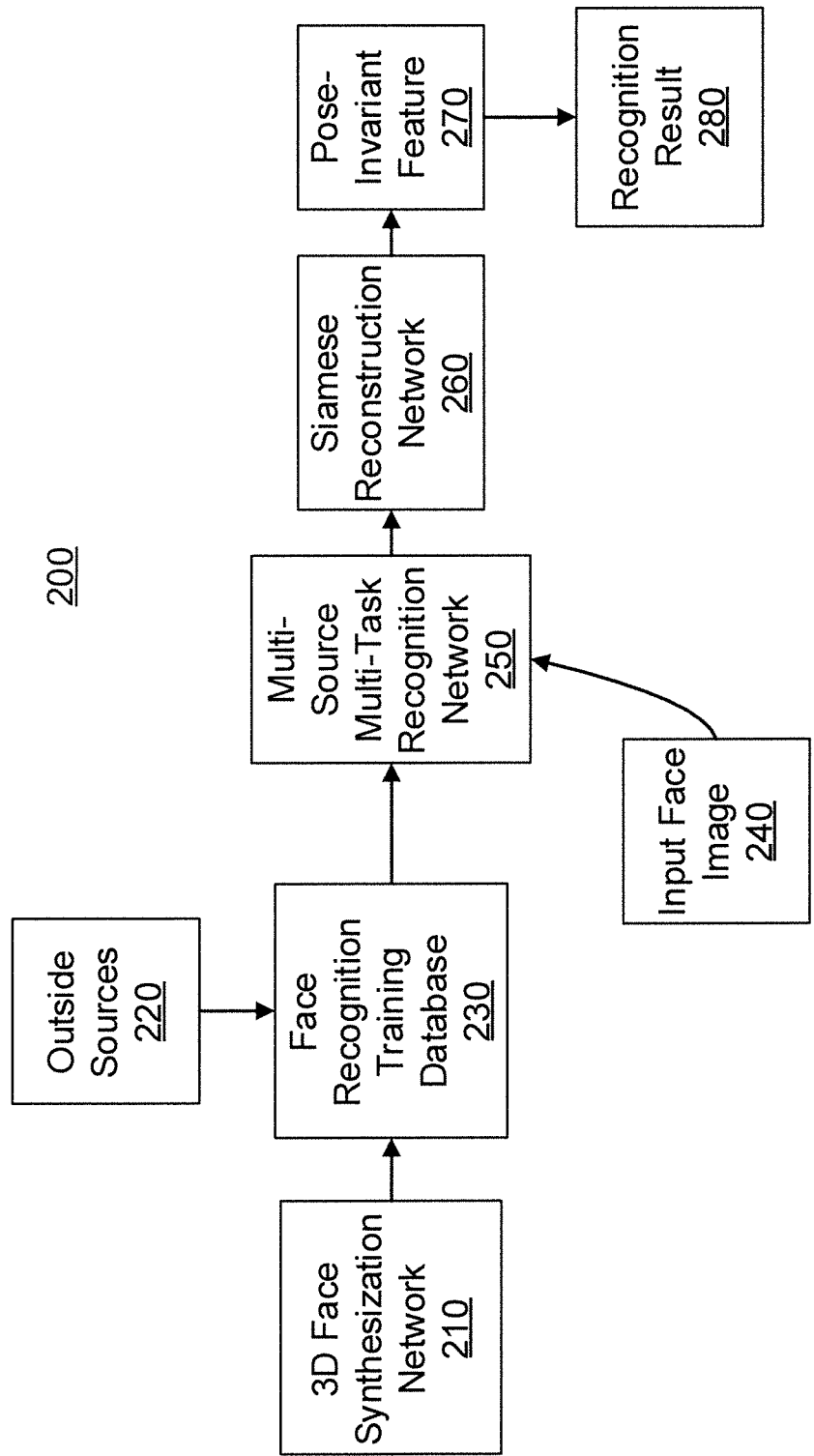
FIG. 2 shows a high-level block/flow diagram of a pose-invariant facial recognition method using a Siamese reconstruction convolutional neural network method, in accordance with an embodiment of the present invention.

A novel pose-invariant feature learning process is provided based on a face recognition framework, which remarkably improves the performance, especially on large pose variation faces. FIG. 2 shows a pose-invariant facial recognition method using a Siamese reconstruction convolutional neural network method, in accordance with an embodiment of the present invention, which is functionally partitioned into three stages. First, a synthesization network 210 is designed to augment the faces with poses and obtain the zero-cost ground truth labels. An assumption is that the features from general deep neural networks (DNNs) may not purely contain the identity information, which could be improved by disentangling the identity information from the non-identity information. In order to achieve this, a multi-source multi-task training framework 250 is designed to generate a rich feature embedding for an input face image 240 which is further branched into identity feature and non-identity feature. The input face 240 can be in a still image, a frame from a video file, or a frame from a live video stream. Finally, a Siamese reconstruction sub-network 260 is designed to disentangle the identity feature for better discriminality and pose-invariance.

To enrich per-subject variations, a series of pose-variant faces are synthesized from a near-frontal image, while all the synthesized images share the same subject label. This augmentation is crucial to investigate pose-invariant face features, given the fact that near-frontal faces take up the major portion of the most face databases.

As shown in FIG. 2, a synthesization network 210 is designed to predict the facial shape S from an image I, where $S \in \mathbb{R}^{3 \times N}$ are 3D coordinates of total N vertexes. It is difficult to learn a direct mapping I→S as N is usually more than 10 k for dense meshes. Instead, a nonlinear mapping I→p is learned, where dim(p)<<dim(S). Here the 3D Morphable Model (3DMM) is applied and p is the parameter that controls both rigid affine transformation and non-rigid facial deformation from a 3D mean shape $\bar{S}$ to the instance shape S:

$$S(p) = sR(\bar{S} + \Phi_{id}\alpha_{id} + \Phi_{exp}\alpha_{exp}) + T \qquad (1)$$

where p={s, R, T, $\alpha_{id}$, $\alpha_{exp}$} including scale s, rotation R, translation T, identity coefficient $\alpha_{id}$ and expression coefficient $\alpha_{exp}$. The eigen basis $\Phi_{id}$ and $\Phi_{exp}$ are offline learned using 3D face scans to model the identity and expression subspace, respectively.

Once p is estimated, the 3D face shape S is calculated using Eqn. 1. To synthesize new face images, near-frontal faces are picked and their corresponding 3D shapes are rotated by manipulating the yaw angle θ in R. New viewpoints in every 5° across the whole 180° are sampled and then they are projected onto 2D. Z-Buffer collecting texture information is applied and the background for high-fidelity recovery is rendered.

A key contribution of the proposed face synthesization is that only near-frontal faces are utilized to generate non-frontal views. It is radically different from the widely employed frontalization techniques, which usually rotate non-frontal faces to a uniformed frontal view. The benefits are two folds. First, the frontal to non-frontal synthesization can effectively avoid missing textures due to the self occlusion, which is a common issue in frontalization techniques. Second, different from face frontalization, enriching instead of reducing intra-subject variations provides important training examples to investigate the pose-invariant representation, which is discussed in the following sections.

A rich embedding of both identity and non-identity information is achieved by fine-tuning an off-the-shelf recognition network to generate a face recognition training database 230 using outside sources 220. The main idea is to take advantage of different training resources (multi-source) to learn both identity and non-identity tasks (multi-task) simultaneously.

Figure 3:
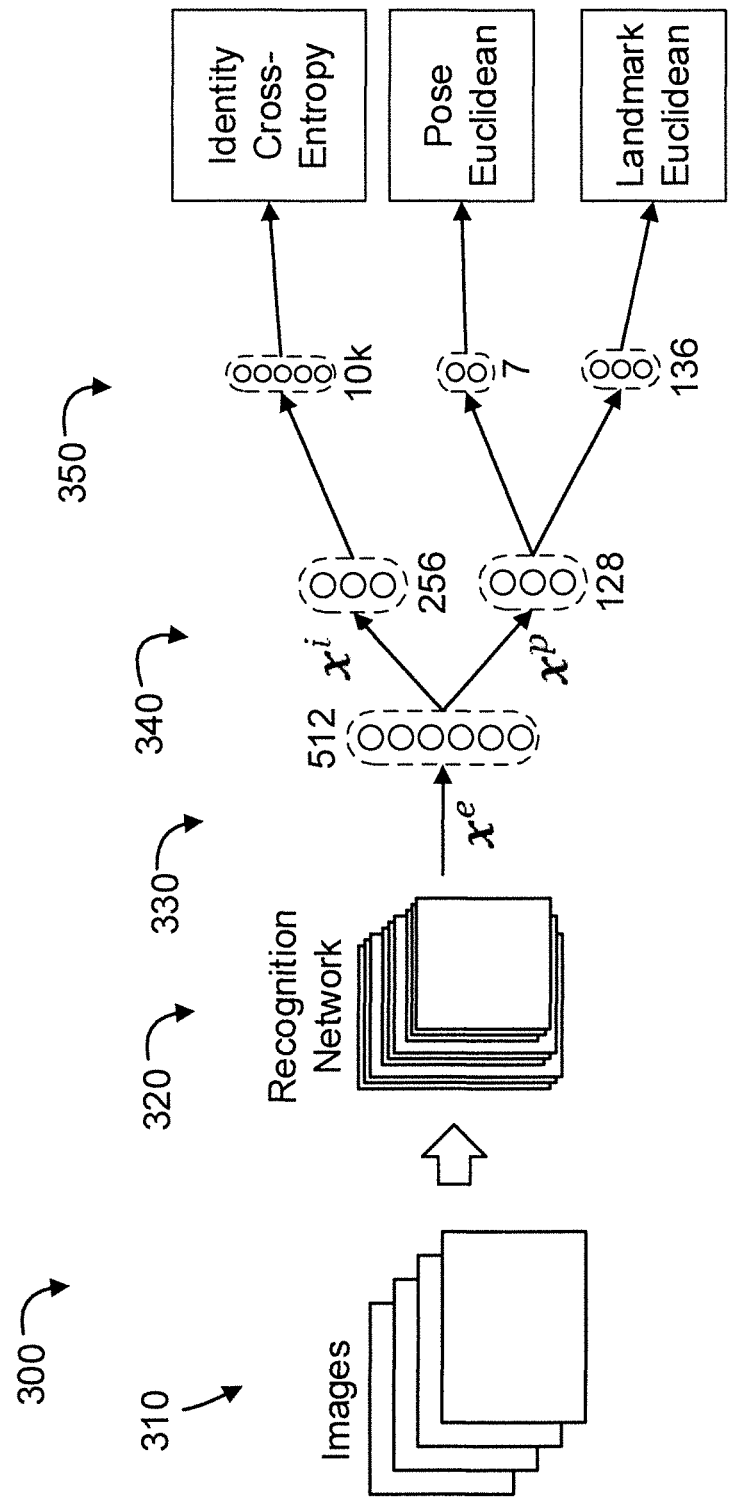
FIG. 3 shows a high-level block/flow diagram of a multi-task multi-source recognition network method, in accordance with an embodiment of the present invention.

FIG. 3 shows a high-level block/flow diagram of a multi-task multi-source recognition network method 300, in accordance with an embodiment of the present invention. Multiple datasets and images are employed, at step 310, to tune the network: some have only identity-related annotation, e.g., CASIA-WebFace; some have both identity-related and identity-unrelated annotation, e.g., 300WLP and MultiPIE. More importantly, since pose or landmarks are expensive to collect, the databases with labeling of pose or landmarks are usually small, which is easily to be overfitting when trained merely on this dataset. Multiple source training significantly overcomes the overfitting problems.

For the pose annotation, the projection matrix $P \in \mathbb{R}^{3 \times 3}$ is employed to model scale s, rotation R and translation T from the 3D mean shape $\bar{S}$ to the instance shape S, which is exactly the same as the rigid part of the 3DMM parameters p defined above. More reliable annotations can be obtained by incorporating $\bar{S}$ as the shape prior since the projection matrix is fully constrained in the 3D domain.

For the landmark annotation, 68 landmarks are employed to locate major facial components, e.g., eyes, mouth and nose. The landmark positions can be easily computed by indexing 68 key points from the reconstructed 3D shape S after removing their z coordinates. The landmark coordinates encode rich identity-unrelated information, such as facial deformations and pose variations, but contain very limited identity-related information since landmark locations may be very close for different persons but may be very distinctive for the same subject after changing the viewpoint.

Suppose there are total N training images and T tasks, with $x_n^t$ and $y_n^t$ being the feature vector and label, respectively. Multiple tasks are jointly optimized:

$$\operatorname*{argmin}_{W^t} \sum_{n=1}^{N} \sum_{t=1}^{T} \ell^t(y_n^t, f(x_n^t; W^t)) + \Phi(W^t) \qquad (2)$$

where $f(x^t; W^t)$ is a function of $x^t$ and parameterized by weights $W^t$. $\ell(\cdot)$ is the loss function. $\Phi(W)$ is the regularization term that penalizes the complexity of weights.

As illustrated in FIG. 3, an off-the-shelf recognition network is fine-tuned, at step 320, to obtain a rich embedding $x^e$, at step 330, which is then forwarded into two separate channels, at step 340: one is employed as the representation of identity-related factors $x^i$ and the other is employed as the representation of identity-unrelated factors $x^p$. The network parameters are optimized in a multi-task learning framework, at step 350:

$$\operatorname*{arg\,min}_{W^i, W^p} \sum_{n=1}^{N} \ell^i(y_n^i, f(x_n^i; W^i)) + \qquad (3)$$

$$\lambda \sum_{n=1}^{N} \ell^p(y_n^p, f(x_n^p; W^p)) + \ell^l(y_n^l, f(x_n^p; W^p))$$

where $y_n^i$, $y_n^p$ and $y_n^l$ and denote identity, pose and landmark labels. The Cross-Entropy loss is employed for identity task $\ell^i$, and the Euclidean loss for both pose task $\ell^p$ and landmark task $\ell^l$. λ balances the identity related and unrelated tasks.

It is worth mentioning that all the three tasks are jointly learned in the same network but using different representation layers. Therefore, $W^i$ and $W^p$ share most weights except the final fully connected layers.

There is no guarantee that identity related and unrelated features are fully decoupled even though $x^i$ and $x^p$ are learned in different tasks. To obtain pose-invariant identity feature 270, a Siamese self and cross reconstruction network is employed to distill the identity representation into a recognition result 280.

Figure 4:
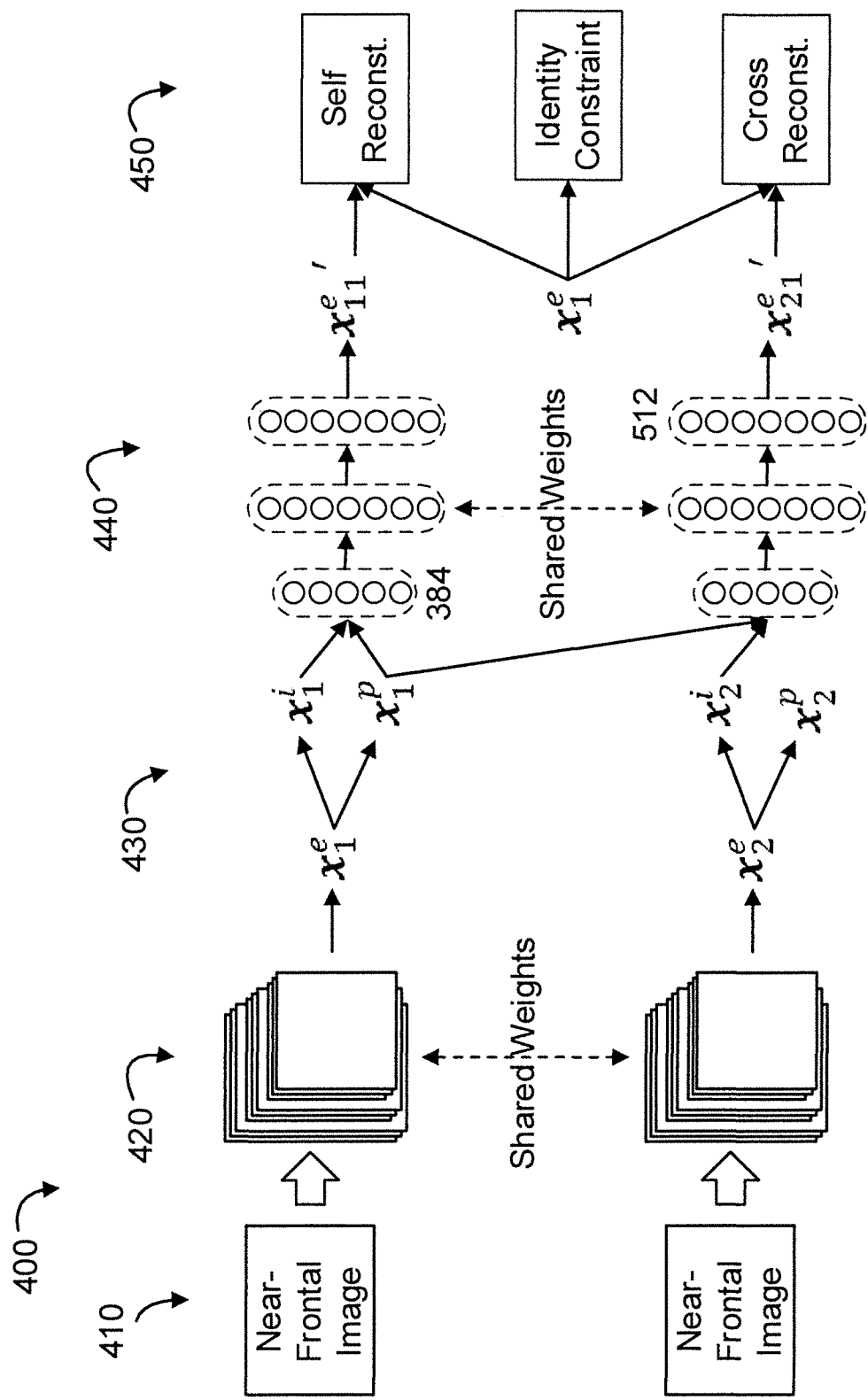
FIG. 4 shows a high-level block/flow diagram of a Siamese reconstruction network method, in accordance with an embodiment of the present invention.

FIG. 4 shows a high-level block/flow diagram of a Siamese reconstruction network method 400, in accordance with an embodiment of the present invention. The first step is to generate image pairs that share the same identity but have different viewpoint labels, at step 410. Specifically, all training images are arranged into four groups according to their absolute yaw angles: $\{G_1: \theta \in [0°, 5°], G_2: \theta \in (5°, 30°], G_3: \theta \in (30°, 60°], G_4: \theta \in (60°, 90°]\}$. The reference image inside the pairs is randomly selected from $G_1$, while the peer image is randomly picked from $G_{2-4}$ to be the same subject but with viewpoint change. Training pairs are prepared for reconstruction: first $\{G_1, G_2\}$, then adding $\{\{G_1, G_3\}$, and finally adding $\{G_1, G_4\}$.

The image pairs are employed to distill the identity features. $\{I_1, I_2\}$ are fed into the pre-trained recognition network, at step 420, which provides the rich feature embedding $x_1^e$ and $x_2^e$, and further branches into identity features $x_1^i$, $x_2^i$ and nonidentity features $x_1^p$, $x_2^p$ at step 430. The self and cross reconstruction tasks, at step 440, are defined as:

$$\operatorname*{arg\,min}_{x^e \to x^i, W^r} \sum_{Pairs} \ell^i(y_1^i, f(x_1^i; W^i)) + \qquad (4)$$

$$\gamma \sum_{Pairs} (\ell^r(x_1^e, g(x_1^i, x_1^p; W^r)) + \ell^r(x_1^e, g(x_2^i, x_1^p; W^r)))$$

where $g(x^i, x^p; W^r)$ is the reconstruction sub-network parameterized by weights $W^r$. The self reconstruction network takes the concatenation of $x_1^i$ and $x_1^p$ as input and outputs a reconstructed rich embedding $x_{11}^{e'}$. Similarly, the cross reconstruction takes the concatenation of $x_1^p$ and $x_2^i$ as input and outputs a reconstructed rich feature $x_{21}^{e'}$. The reconstruction loss is defined as $l^r(a,b)=\|a-b\|^2$. There are three loss terms: the first one, the identity loss preserves the discriminative power of the identity feature $x_1^i$; the second one penalizes the self reconstruction errors in $I_1$; and the third one constrains the cross reconstruction from $I_2$ to $I_1$. $\gamma$ balances different losses, at step 450.

By regularizing both self reconstruction and cross reconstruction to be close to the original reference rich embedding, the identity feature from pose-variant peer are constrained to be similar to the near-frontal reference one. In other words, it implicitly turns the non-frontal face into frontal one at the feature level, while the face frontalization techniques explicitly turn the non-frontal faces into frontal ones, from which the missing appearance due to pose variations are completed. The completed missing appearance may be erroneous as there is no firm causality for the completing techniques to recover from visible face appearance for the invisible parts. However, there is no hard constraint for frontalization. Rather, the data-driven feature level learning is emphasized to pursue pose-invariant representation by both the self and cross reconstruction. In the meanwhile, the identity loss preserves the discriminality of the identity features.

As illustrated in FIG. 2, the framework involves two deep networks, one for pose-variant face synthesization 210 and the other for pose-invariant face recognition 250.

The synthesization network 210 is used to predict coefficients related to the identity, facial expression, and affine transformation for 3D morphable model (3DMM) and the network architecture similar to that of VGG16 is adopted, which is composed of 16 convolution layers followed by a couple of fully connected layers. For the synthesization network, two 1024-d fully connected layers are appended to the last convolution layer and the final 1024-d neurons are used to predict 30-d identity coefficients, 29-d expression coefficients, and 7-d pose coefficients through multi-task training. Instead of using 199-d identity coefficients, 30 principal components are employed that preserves 90% of the variance for identity coefficients, which leads to fast convergence and less overfitting. The shape is reconstructed based on Equation 1. For texture, no significant problem of missing texture causing a low fidelity synthesization since we synthesize non-frontal face images from frontal face images was found. The same Z-Buffer algorithm is applied to prevent the ambiguous pixel intensity due to same image plane position but different depths.

The recognition network 250 is composed of 12 convolutional layers followed by 512-d fully connected layer. As shown in FIG. 3, two separate fully connected layers are appended on top of 512-d neurons, one with 256-d neurons for identity related tasks (e.g., identification from multiple sources) and the other with 128-d neurons for identity-unrelated tasks (e.g., pose estimation or landmark localization). CASIA WebFace database and 300WLP (or MultiPIE) dataset are employed to train the network. Since CASIA database only comes with the identity label, it is used only for the identification task using softmax loss on top of 256-d identity-related neurons. On the other hand, 300WLP and MultiPIE are used for both identification and landmark localization as well as pose estimation. For pose estimation, 3-d estimation target is employed that is composed of pitch, yaw, and roll angles. For landmark localization, 136-d estimation target based is employed on the normalized (x,y) positions of 68 facial landmarks.

Training the recognition network involves two steps, where the network is first pretrained using data from multiple sources with multi-task objectives and then the upper layers of the network are trained using pairwise reconstruction objective with shared identity-related neurons. In the first step, the recognition network is trained from scratch using the mini-batch size of 512 that is further split into 448 and 64 for CASIA and 300WLP (or MultiPIE) datasets, respectively. Adam is employed for stochastic optimization with learning rate of 0.0003 and the networks are trained until convergence. In the second step, all network parameters are frozen before the first fully connected layer, and the identity-related and unrelated network parameters using Siamese reconstruction regularization are trained, as shown in FIG. 4. Note that the identification loss is still used to train identity-related network parameters. The same minibatch size of 512 is employed, but reduce the size of CASIA database into 384 since the data for 300WLP comes in pair.

The Siamese reconstruction regularization method is evaluated on two main pose variant databases, i.e., MultiPIE and 300WLP, compared with two top general face recognition frameworks, VGGFace and N-pair loss face recognition. More specifically, it is compared with three state-of-the-art methods, i.e., MvDA, GMA and MvDN, which exactly deal with the pose variation problem in face recognition. In order to reveal the significance of the designed structure, the step-wise baselines are presented to compare each of the modules, i.e., the single source CASIA model, the single source model separately fine-tuned on MultiPIE and 300WLP, the multisource multi-task (MSMT) training on CASIA and MultiPIE, CASIA and 300WLP respectively. To illustrate the generalization ability, conduct a cross database evaluation is conducted to test MultiPIE trained model on 300WLP test set and test 300WLP trained model on MultiPIE test set.

MultiPIE database is composed of 754,200 images of 337 subjects with different factors of variation such as pose, illumination, and expression. Each subject has face images of 15 different head poses and 20 different illumination conditions, where only images of 13 head poses are used with only yaw angle changes from −90° to 90°, with 15° difference every consecutive pose bin in this experiment. The data was split into train and test by subjects, of which the first 229 subjects are used for training and the remaining 108 are used for testing. This is similar to other experimental settings, but the entire data is used including both illumination and expression variations for training while excluding only those images taken with top-down views. Rank-1 recognition accuracy is reported of non-frontal face images (±15° to ±90°) as query and the frontal faces (0°) as gallery, while restricting illumination condition to neutral. To be consistent with other experimental settings, a gallery set is formed by randomly select 2 frontal face images per subject, of which in total 216 images, and evaluate the recognition accuracy for all query examples, of which in total 619 images per pose. The procedure is iterated for 10 random selection of gallery sets and report the mean accuracy. The performance is also evaluated with the gallery set that includes all frontal face images of test subjects, of which in total 619 images.

The recognition accuracy at every 15° interval of yaw angle is reported while averaging its symmetric counterpart with respect to the 0-yaw axis. The method is compared to state-of-the art methods on multi-view face recognition, such as Multiview discriminant analysis (MvDA), generalized Multiview analysis (GMA), and multi-view deep network (MvDN). In addition, the performance is evaluated on two general DNN based face recognition methods, such as VGGFace and N-pair loss face recognition models. These models are trained on large scale labeled web face images, which may not be specifically designed to handle large pose variations.

The GMA, MvDA, and MvDN demonstrate good performance within 30° yaw angles, but the performance starts to degrade significantly when yaw angle is larger than 30°. In contrast, the method shows much smaller accuracy drop when the head pose variations increase from 45° to 90°. For example, the method improves the previous best method by 3.6% for an extreme profile view (90°). Overall, the method improves the previous state-of-the-art on MultiPIE by 1.5% when averaged across all pose variations. Besides the improved recognition accuracy, the method has an advantage over MvDN, one of the most competitive existing methods, since it does not require pose information at test time. On the other hand, MvDN is composed of multiple sub-networks, each of which is specific to a certain pose variation and therefore requires additional information on head pose for recognition.

For visualization clarity, only 10 randomly selected subjects are visualized from the test set with 0°, 30°, 60°, and 90° yaw angles. Samples from VGGFace feature embedding appear with large overlap among different subjects. On the contrary, with the feature embedding, samples from the same subject are more tightly clustered and there is rare overlap of samples from different subjects, saying that our feature representation contains much less noisy pose information.

A face-in-the-wild database is evaluated, 300 Wild Large Pose (300WLP). Compared to MultiPIE, 300WLP contains mostly outdoor scene faces without constraint on illumination, expressions or poses. The 300WLP is generated from 300W face database by 3DDFA, in which it establishes a 3D morphable model and reconstruct the face appearance with varying head poses. In 300W, the subset AFW contains 5,207 images, Helen with 37,676 images, iBug with 1,786 images and LFPW with 16,556 images. Together with each of their left-right flipped synthesization, the 300WLP consists of overall 122,430 images from 3,837 subjects. Compared to MultiPIE, the overall volume of images is smaller, but the number of subjects is significantly larger, given that the 2.6M VGG face database contains only 2,622 subjects. For each subject, the images are with uniformly distributed continuous varying head poses in contrast to MultiPIE's strictly controlled every 15° head poses. Since 300WLP is synthesized from 300W, within each subject, the only variation is the head pose. The lighting conditions as well as the background are almost identical. Thus, it is an ideal dataset to evaluate the method in terms of pose variation.

500 subjects of 8014 images (16028 if flipping) are randomly split as testing data and the rest of 3337 subjects of 106,402 images are the training data. Among the testing data, two 0° head pose images per subject form the gallery and the rest of the 7014 images serves as the probe. The method is only compared with the two general face recognition frameworks. Since head poses in 300WLP continuously vary, we group the test samples into 6 pose intervals, (0, 15°), (15°, 30°), (30°, 45°), (45°, 60°), (60°, 75°) and (75°, 90°). For short annotation, we mark each interval with the end point, e.g., 30° denotes the pose interval (15°, 30°). The method achieves clearly better accuracy across all the pose intervals. It is predictable because the method tends to provide pose-invariant features, whereas the other methods may be pose sensitive as the facial appearance changes.

The Labeled Faces-in-the-Wild (LFW) dataset is evaluated. It is noted that the dataset is particularly biased towards frontal poses. Among 6,000 verification image pairs, only 358 pairs are with large pose variations, of which at least one image is with pose greater than 30°. The numbers are only to illustrate the potential of the framework for recognition in-the-wild under large poses. On the above subset of non-frontal images, 96.37% verification accuracy is achieved using the MSMT baseline model, which improves to 96.93% using the reconstruction-based disentanglement. This demonstrates that the method also applies to unconstrained scenarios. The VGGFace model achieves 97.49% accuracy on the same subset. However, it is trained on a dataset much larger than the combination of CASIA and MultiPIE.

A Siamese reconstruction loss to regularize the identity feature learning for face recognition is provided. A data synthesization strategy is employed to enrich the diversity of pose, requiring no additional training data. To construct the Siamese reconstruction, a multi-source multitask network is set up for both preparing the identity and nonidentity features and improving the feature discrimination ability. The Siamese reconstruction regularization shows significant improvement on both MultiPIE and 300WLP with 2% to 12% gap. Cross database evaluation further verifies that the mothos is well generalized to across databases.

Figure 5:
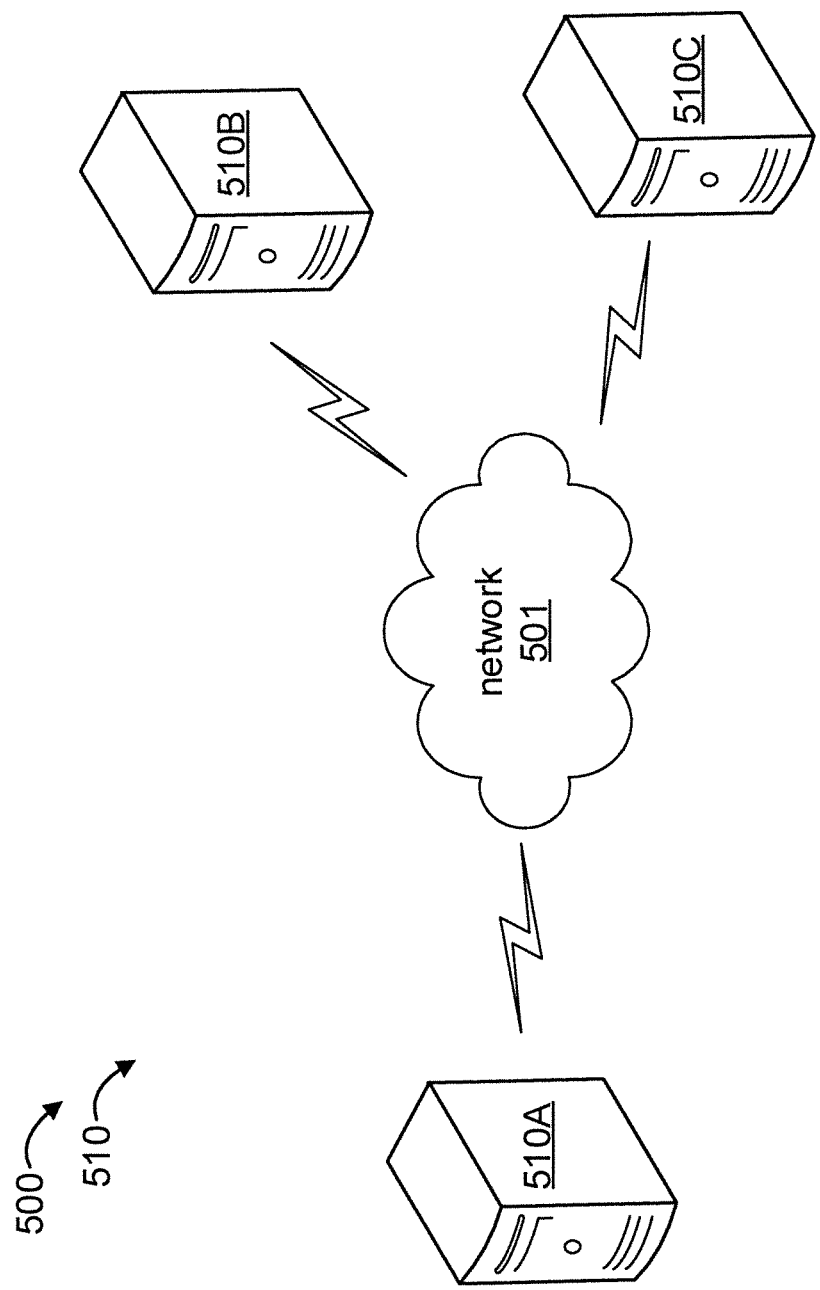
FIG. 5 shows a block diagram of an exemplary environment to which the present invention can be applied, in accordance with an embodiment of the present invention.

FIG. 5 shows an exemplary environment 500 to which the present invention can be applied, in accordance with an embodiment of the present invention. The environment 500 is representative of a computer network to which the present invention can be applied. The elements shown relative to FIG. 5 are set forth for the sake of illustration. However, it is to be appreciated that the present invention can be applied to other network configurations as readily contemplated by one of ordinary skill in the art given the teachings of the present invention provided herein, while maintaining the spirit of the present invention.

The environment 500 at least includes a set of computer processing systems 510. The computer processing systems 510 can be any type of computer processing system including, but not limited to, servers, workstations, desktops, laptops, tablets, cellphones, smart phones, media playback devices, and so forth. For the sake of illustration, the computer processing systems 510 include server 510A, server 510B, and server 510C.

In an embodiment, the present invention performs a pose-invariant facial recognition method using a Siamese reconstruction convolutional neural network for any of the computer processing systems 510. Thus, any of the computer processing systems 510 can perform pose-invariant facial recognition that can be stored in, or accessed by, any of the computer processing systems 510. Moreover, the output (including identified user) of the present invention can be used to control other systems and/or devices and/or operations and/or so forth, as readily appreciated by one of ordinary skill in the art given the teachings of the present invention provided herein, while maintaining the spirit of the present invention.

In the embodiment shown in FIG. 5, the elements thereof are interconnected by a network(s) 501. However, in other embodiments, other types of connections can also be used. Additionally, one or more elements in FIG. 5 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 500 are readily determined by one of ordinary skill in the art, given the teachings of the present invention provided herein, while maintaining the spirit of the present invention.

Figure 6:
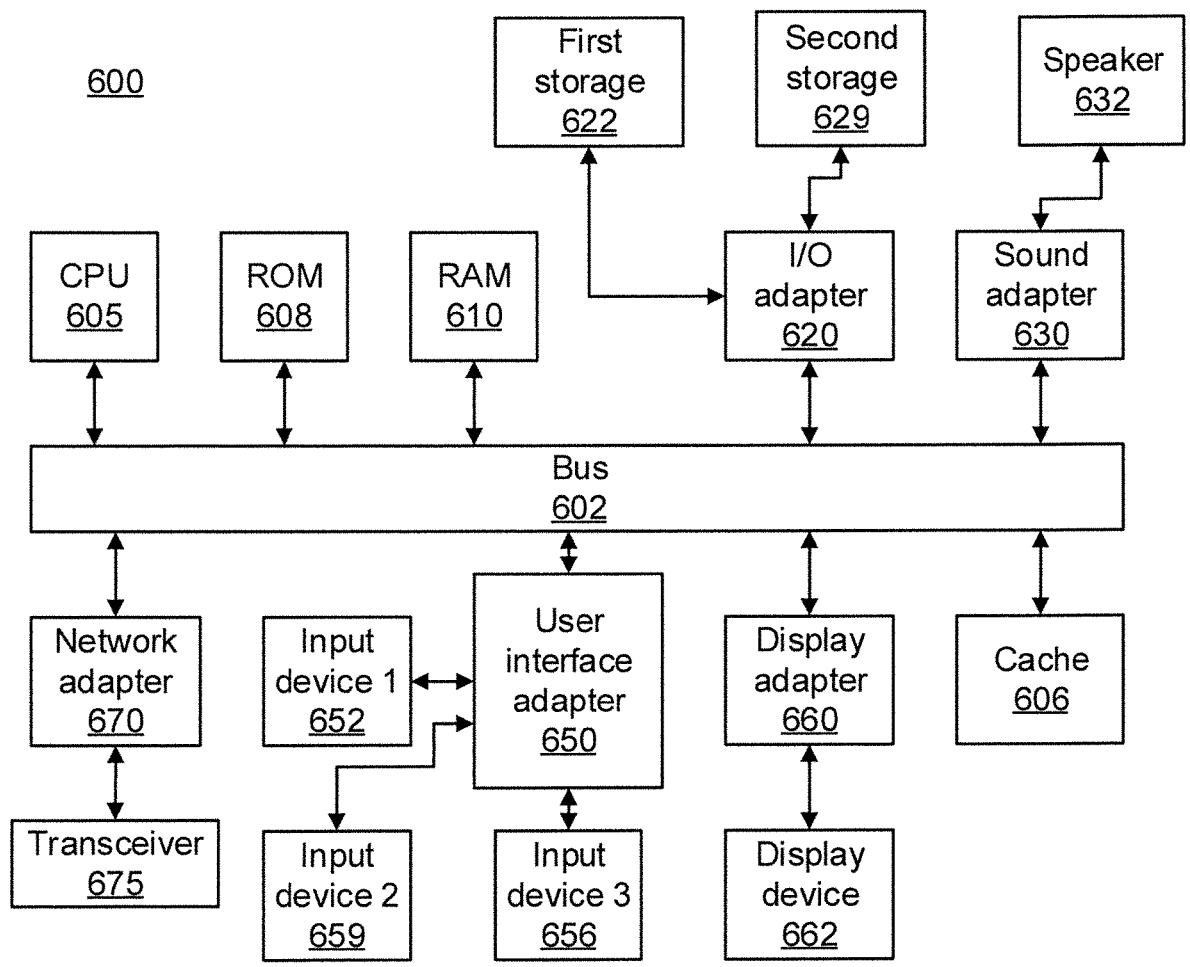
FIG. 6 shows a block diagram illustrating a computer processing system, in accordance with an embodiment of the present invention.

Referring to FIG. 6, an exemplary computer system 600 is shown which may represent a server or a network device, in accordance with an embodiment of the present invention. The computer system 600 includes at least one processor (CPU) 605 operatively coupled to other components via a system bus 602. A cache 606, a Read Only Memory (ROM) 608, a Random Access Memory (RAM) 610, an input/output (I/O) adapter 620, a sound adapter 630, a network adapter 670, a user interface adapter 650, and a display adapter 660, are operatively coupled to the system bus 602.

A first storage device 622 and a second storage device 629 are operatively coupled to system bus 602 by the I/O adapter 620. The storage devices 622 and 629 can be any of a disk storage device (e.g., a magnetic or optical disk storage device), a solid state magnetic device, and so forth. The storage devices 622 and 629 can be the same type of storage device or different types of storage devices.

A speaker 632 may be operatively coupled to system bus 602 by the sound adapter 630. A transceiver 675 is operatively coupled to system bus 602 by network adapter 670. A display device 662 is operatively coupled to system bus 602 by display adapter 660.

A first user input device 652, a second user input device 659, and a third user input device 656 are operatively coupled to system bus 602 by user interface adapter 650. The user input devices 652, 659, and 656 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 652, 659, and 656 can be the same type of user input device or different types of user input devices. The user input devices 652, 659, and 656 are used to input and output information to and from system 600.

Of course, the computer system 600 may also include other elements (not shown), as readily contemplated by one of skill in the art, as well as omit certain elements. For example, various other input devices and/or output devices can be included in computer system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 600 are readily contemplated by one of ordinary skill in the art given the teachings of the present invention provided herein.

Moreover, it is to be appreciated that environment 100 and environment 500 described with respect to FIG. 1 and FIG. 5 are environments for implementing respective embodiments of the present invention. Part or all of processing system 600 may be implemented in one or more of the elements of environment 100 and/or one or more of the elements of environment 500.

Figure 8:
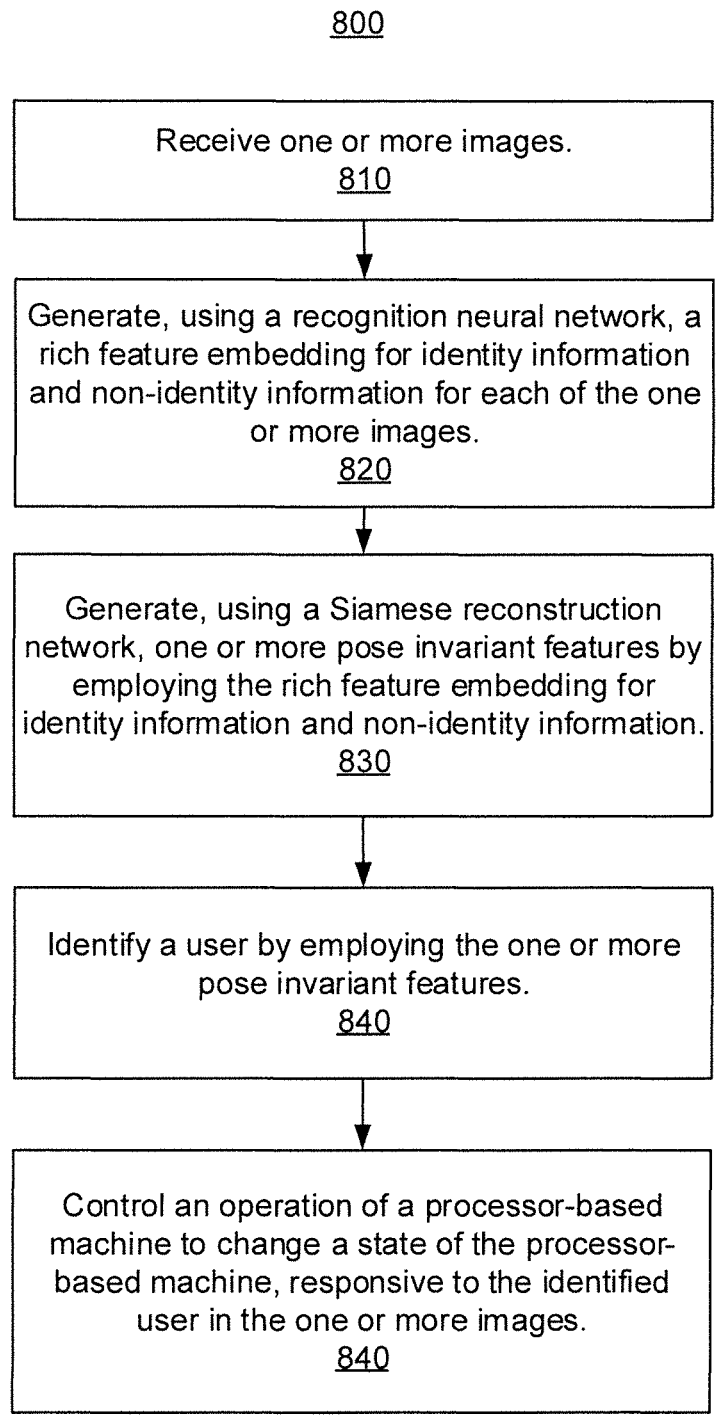
FIG. 8 is a flow diagram illustrating a method for pose-invariant facial recognition, in accordance with an embodiment of the present invention.
Figure 9:
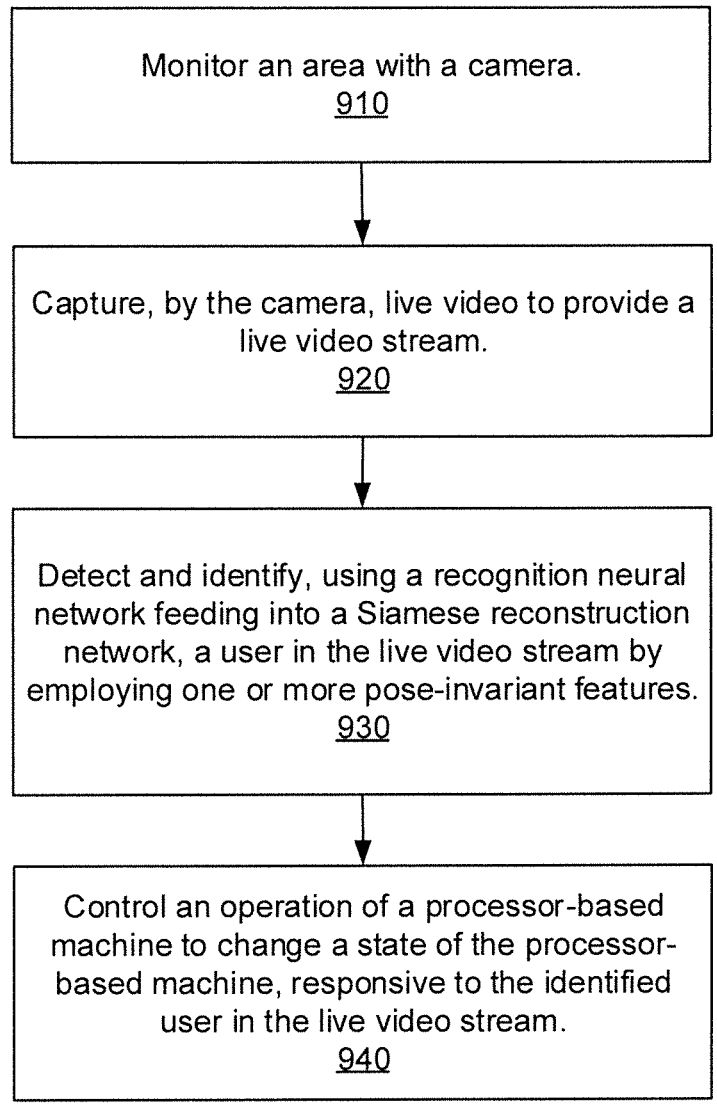
FIG. 9 is a flow diagram illustrating a method for video security, in accordance with an embodiment of the present invention.

Further, it is to be appreciated that processing system 600 may perform at least part of the method described herein including, for example, at least part of method 200 of FIG. 2 and/or at least part of method 300 of FIG. 3 and/or at least part of method 400 of FIG. 4 and/or at least part of method 800 of FIG. 8 and/or at least part of method 900 of FIG. 9. Similarly, part or all of system 710 may be used to perform at least part of the functions implicated by one or more elements of method 200 of FIG. 2 and/or at least part of method 300 of FIG. 3 and/or at least part of method 400 of FIG. 4 and/or at least part of method 800 of FIG. 8 and/or at least part of method 900 of FIG. 9.

Figure 7:
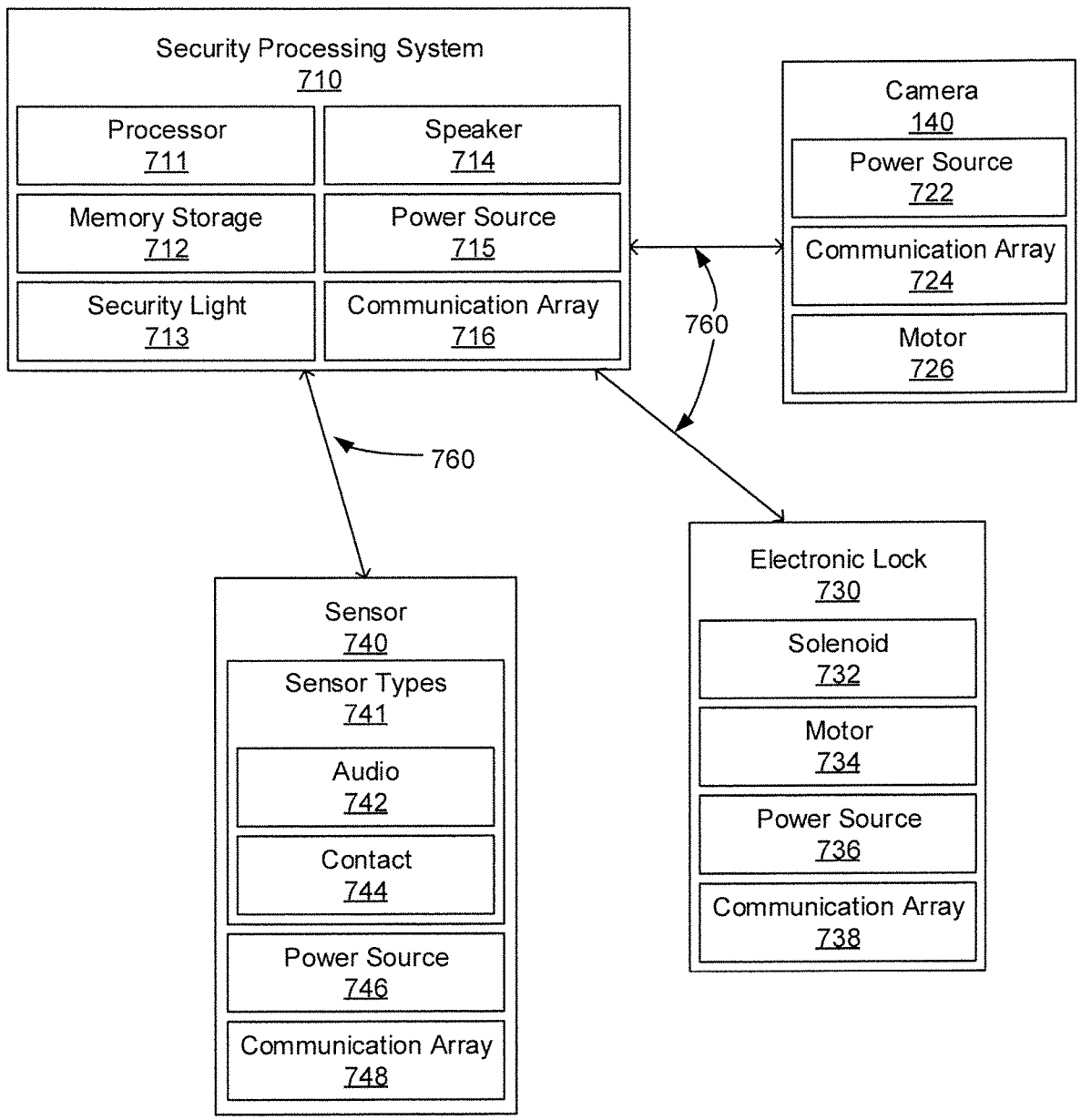
FIG. 7 shows a block/flow diagram of a video security system, in accordance with an embodiment of the present invention.

The invention as described may be used in many different embodiments. One useful embodiment may have the invention in a video security system. FIG. 7 shows a block/flow diagram of a video security system 700, in accordance with an embodiment of the present invention. The video security system 700 can include features found in a normal alarm system. The video security system 700 may include a security processing system 710. The security processing system 710 may include a processing system 600 from in FIG. 6. The security processing system 710 may be equipped with computing functions and controls. The security processing system 710 may include one or more processors 711 (hereafter "processor"). The security processing system 710 may include a memory storage 712. The memory storage 712 may include solid state or soft storage and work in conjunction with other devices of the video security system 700 to record data, run algorithms or programs, store safety procedures, perform pose-invariant facial recognition using a Siamese reconstruction convolutional neural network, etc. The memory storage 712 may include a Read Only Memory (ROM), random access memory (RAM), or any other type of memory useful for the present applications.

The security processing system 710 may include a communication array 716 to handle communications between the different devices in the video security system 700. In one embodiment, the communication array 716 may be equipped to communicate with a cellular network system. In this way, the security processing system 710 may contact a control center with information related to the status of the video security system 700 and the property the system is securing. The communication array 716 may include a WIFI or equivalent radio system, a local area network (LAN), hardwired system, etc. The communication array 716 may provide the security processing system 710 a communication channel 760 with other devices in the video monitoring system 700.

The security processing system 710 may include a power source 715. The power source 715 may include or employ one or more batteries, a generator with liquid fuel (e.g., gasoline, alcohol, diesel, etc.) or other energy source. In another embodiment, the power source 715 may include one or more solar cells or one or more fuel cells. In another embodiment, the power source 715 may include power from the building with the video security system 700. The security processing system 710 may have multiple sources in the power source 715. In one embodiment, the security processing system 710 may include power directly from the building and a battery system as a back-up to ensure the video security system 700 stays active if a power interruption occurs.

The security processing system 710 may include a security light 713. The security light 713 may be illuminated when the security processing system 710 detects an intruder in the area of the security light 713 to deter the intruder or give investigators improved visibility in the area of the security light 713. The security processing system 710 may include a speaker 714. The speaker 714 may act as an alarm when the security processing system 710 detects an intruder in a secure area to deter the intruder or notify investigators of an intruder.

Of course, the security processing system 710 may also include other elements (not shown), as readily contemplated by one of skill in the art, as well as omit certain elements. For example, various other input devices and/or output devices can be included in the security processing system 710, depending upon the particular implementation of the same, as readily understood by one of ordinary skill in the art. For example, various types of wireless and/or wired input and/or output devices can be used. Moreover, additional processors, displays, controllers, memories, and so forth, in various configurations can also be utilized as readily appreciated by one of ordinary skill in the art. These and other variations of the security processing system 710 are readily contemplated by one of ordinary skill in the art given the teachings of the present invention provided herein.

The video security system 700 may include a camera 140. The camera 140 may communicate through the communication channel 760 to the security processing system 710. The camera 140 may include a power source 722. The power source 722 may include or employ one or more batteries or other energy source. In another embodiment, the power source 722 may include one or more solar cells or one or more fuel cells. In another embodiment, the power source 722 may include power from the building with the video monitoring system 700. In yet another embodiment, the power source 722 may include power through the communication channel 760 linking the camera 140 to the security processing system 710. The camera 140 may have multiple sources in the power source 722. In one embodiment, the camera 140 may include power through the communication channel 760 and a battery system as a back-up to ensure the camera 140 stays active if a power interruption occurs.

The camera 140 may include a communication array 724 to handle communications between the camera 140 and the security processing system 710. In one embodiment, the communication array 724 may be equipped to communicate with a cellular network system. The communication array 724 may include a WIFI or equivalent radio system, a local area network (LAN), hardwired system, etc. The communication array 724 may connect the camera 140 to the security processing system 710 through the communication channel 760.

The camera 140 may include one or more motors 726 (hereafter "motor"). The motor 726 may physically move the camera 140, so the field of view covered by the camera 140 is greater than the field of view of the camera 140. The motor 726 may be used to zoom a lens in the camera 140 to get a zoomed in image of the area being covered by the camera 140. The motor 726 may be controlled by commands originating in the camera 140 or from commands originating in the security processing system 710.

Of course, the camera 140 may also include other elements (not shown), as readily contemplated by one of skill in the art, as well as omit certain elements. For example, various other lens or lights for night vision or infrared detection may be included in the camera 140, depending upon the particular implementation of the same, as readily understood by one of ordinary skill in the art.

The video security system 700 may include an electronic lock 730. The electronic lock 730 may communicate through the communication channel 760 to the security processing system 710. The electronic lock 730 may include a power source 736. The power source 736 may include or employ one or more batteries or other energy source. In another embodiment, the power source 736 may include one or more solar cells or one or more fuel cells. In another embodiment, the power source 736 may include power from the building with the video security system 700. In yet another embodiment, the power source 736 may include power through the communication channel 760 linking the electronic lock 730 to the security processing system 710. The electronic lock 730 may have multiple sources in the power source 736. In one embodiment, the electronic lock 730 may include power through the communication channel 760 and a battery system as a back-up to ensure the electronic lock 730 stays active if a power interruption occurs.

The electronic lock 730 may include a communication array 738 to handle communications between the electronic lock 730 and the security processing system 710. In one embodiment, the communication array 738 may be equipped to communicate with a cellular network system. The communication array 738 may include a WIFI or equivalent radio system, a local area network (LAN), hardwired system, etc. The communication array 738 may connect the electronic lock 730 to the security processing system 710 through the communication channel 760.

The electronic lock 730 may include a motor 734. The motor 734 may physically actuate a bolt in the electronic lock 730. In one embodiment, the motor 734 actuates one or more bolts along a door to lock the door. In another embodiment, the motor 734 may actuate a hook in a window to lock the window. The motor 734 may be controlled by commands originating in the electronic lock 730 or from commands originating in the security processing system 710.

The electronic lock 730 may include a solenoid 732. The solenoid 732 may physically actuate a bolt in the electronic lock 730. In one embodiment, the solenoid 732 actuates one or more bolts along a door to lock the door. In another embodiment, the solenoid 732 may actuate a hook in a window to lock the window. The solenoid 732 may be controlled by commands originating in the electronic lock 730 or from commands originating in the security processing system 710.

Of course, the electronic lock 730 may also include other elements (not shown), as readily contemplated by one of skill in the art, as well as omit certain elements. For example, various other engaging mechanisms may be included in the electronic lock 730, depending upon the particular implementation of the same, as readily understood by one of ordinary skill in the art.

The video security system 700 may include one or more sensors 740 (hereafter "sensor"). The sensor 740 may communicate through the communication channel 760 to the security processing system 710. The sensor 740 may include a power source 746. The power source 746 may include or employ one or more batteries or other energy source. In another embodiment, the power source 746 may include one or more solar cells or one or more fuel cells. In another embodiment, the power source 746 may include power from the building with the video security system 700. In yet another embodiment, the power source 746 may include power through the communication channel 760 linking the sensor 740 to the security processing system 710. The sensor 740 may have multiple sources in the power source 746. In one embodiment, the sensor 740 may include power through the communication channel 760 and a battery system as a back-up to ensure sensor 740 stays active if a power interruption occurs.

The sensor 740 may have one or more sensor types 741 (hereafter "sensor types"). The sensor types 741 may include audio 742 or contact 744. The sensor 740 may include more than one of the sensor types 741. In one embodiment, the sensor 740 may include an audio 742 and a contact 744. This embodiment may secure a window being able to detect when the window is closed with the contact 744 and being able to detect if broken with the audio 742.

The sensor 740 may include a communication array 748 to handle communications between the sensor 740 and the security processing system 710. In one embodiment, the communication array 748 may be equipped to communicate with a cellular network system. The communication array 748 may include a WIFI or equivalent radio system, a local area network (LAN), hardwired system, etc. The communication array 748 may connect the sensor 740 to the security processing system 710 through the communication channel 760.

Of course, the sensor 740 may also include other elements (not shown), as readily contemplated by one of skill in the art, as well as omit certain elements. For example, various other types of sensors may be included in the sensor 740, such as a temperature sensor for detecting body heat, depending upon the particular implementation of the same, as readily understood by one of ordinary skill in the art.

The security processing system 710 may take video from the camera 140 to monitor the area being secured by the video security system 700. The video security system 700 can be activated and deactivated like a normal alarm system. The security processing system 710 can continue to identify users while the video security system 700 is in both the activated state or deactivated state to allow access to areas in a facility secured by the system while the normal alarm system features are deactivated. The security processing system 710 may recognize a known or unknown user and send a command. In one embodiment, the security processing system 710 may actuate the electronic locks 730 on a door to grant access. In another embodiment, the security processing system 710 may actuate the motor 734 in the electric lock 730 to close and lock doors when an unknown user approaches an open door. The command can be sent to a remote system. The remote system being a server, workstation, cellphone, and so forth. The command can cause the remote system to power down, disconnect network access, or complete a data wipe. Many other actions can be recognized with the present system, with different actions having different responses.

Moreover, it is to be appreciated that video security system 700 may perform at least part of the method described herein including, for example, at least part of method 200 of FIG. 2 and/or at least part of method 300 of FIG. 3 and/or at least part of method 400 of FIG. 4 and/or at least part of method 800 of FIG. 8 and/or at least part of method 900 of FIG. 9.

Referring to FIG. 8, a flow chart for a pose-invariant facial recognition method 800 is illustratively shown, in accordance with an embodiment of the present invention. In block 810, receive one or more images. In block 820, generate, using a recognition neural network, a rich feature embedding for identity information and non-identity information for each of the one or more images. In block 830, generate, using a Siamese reconstruction network, one or more pose-invariant features by employing the rich feature embedding for identity information and non-identity information. In block 840, identify a user by employing the one or more pose-invariant features. In block 850, control an operation of a processor-based machine to change a state of the processor-based machine, responsive to the identified user in the one or more images.

Referring to FIG. 9, a flow chart for a video security method 900 is illustratively shown, in accordance with an embodiment of the present invention. In block 910, monitor an area with a camera. In block 920, capture, by the camera, live video as to provide a live video stream. In block 930, detect and identify, using a recognition neural network feeding into a Siamese reconstruction network, a user in the live video stream by employing one or more pose-invariant features. In block 940, control an operation of a processor-based machine to change a state of the processor-based machine, responsive to the identified user in the live video stream.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A video security system, comprising:
a camera positioned to monitor an area and capture live video to provide one or more live video streams;
a security processing system including a processor and memory coupled to the processor, the processing system configured for:
generating, by a processor using a recognition neural network, a rich feature embedding for identity information and non-identity information for each of the one or more live video streams, the generating further comprising performing disentanglement by:
on an input side, preparing pairs of images from the one or more live video streams, the pairs of images including a first image with a comparatively small head pose change and a second image with a comparatively large head pose change; and
on a network structure side, preparing two branches, the branches including a first identity-related branch and a second head pose related branch, and being configured for self-reconstruction and cross-reconstruction;
predicting, using a synthesization network, a 3-Dimensional (3D) facial shape S from an image I from the pairs of images where $S \in \mathbb{R}^{3 \times N}$ are 3D coordinates of a total N vertexes, wherein a 3D Morphable Model (3DMM) is applied and p is a parameter configured to control both a rigid affine transformation and a non-rigid facial deformation from a 3D mean shape to an instance shape to calculate a 3D facial shape as follows:

$$S(p) = sR(\overline{S} + \Phi_{id}\alpha_{id} + \Phi_{exp}\alpha_{exp}) + T,$$

where p={s, R, T, $\alpha_{id}$, $\alpha_{exp}$} including scale s, rotation R, translation T, identity coefficient $\alpha_{id}$ and expression coefficient $\alpha_{exp}$, wherein an eigen basis $\Phi_{id}$ and $\Phi_{exp}$ are offline learned using 3D face scans to model an identity and expression subspace, respectively;
generating, by the processor using a Siamese reconstruction network, one or more pose-invariant features by employing the rich feature embedding for identity information and non-identity information;
identifying, by the processor, a user by employing based on the predicting and the one or more pose-invariant features; and
controlling an operation of a processor-based machine to change a state of the processor-based machine, responsive to the identified user in the live video stream.

2. The system of claim 1, further comprising one or more sensors capable of detecting a change of state.

3. The system of claim 2, wherein the one or more sensors include a sensor selected from the group consisting of a temperature sensor, a contact sensor, and an audio sensor.

4. The system of claim 1, further comprising a speaker that sounds an alarm when receiving a command from the security processing system.

5. The system of claim 1, wherein the security processing system is further programmed to recognize the user when the video security system is in both an activated state and a deactivated state.

6. The system of claim 1, wherein the processing system is further programmed to record a video clip of the live video stream when the user is identified.

7. The system of claim 6, wherein the processing system is further programmed to send the video clip offsite to a supervisor or a security monitoring station.

8. The system of claim 1, further comprising an electronic lock capable of changing a lock state responsive to receiving a command from the security processing system.

9. The system of claim 8, wherein the electronic lock can both close and secure a door connected to the electronic lock.

10. The system of claim 8, wherein the electronic lock can both unlock and open a door connected to the electronic lock.

11. The system of claim 1, further comprising a remote system configured to change a state on the remote system responsive to receiving a command from the security processing system.

12. The system of claim 11, wherein the remote system is selected from the group consisting of a server, a workstation, and a cellphone.

13. The system of claim 11, wherein changing the state on the remote system is selected from the group consisting of disabling network connectivity to the remote system, powering down the remote system, and wiping data from the remote system.

14. The system of claim 1, wherein the Siamese reconstruction neural network disentangles the identity information and the non-identity information in the rich feature embedding.

15. The system of claim 14, wherein the disentangled rich feature embedding improves discriminality and pose-invariance.

16. The system of claim 1, wherein the Siamese reconstruction neural network minimizes errors between a self-reconstruction and a cross-reconstruction.

17. The system of claim 16, wherein the self-reconstruction combines the identity information with the non-identity information and the cross-reconstruction combines the non-identity information with identity information from another one of the one or more images.

18. The system of claim 11, wherein the processor detects and identifies the user by generating, using the recognition neural network, a rich feature embedding for identity information and non-identity information for frames of the live video stream.

19. A computer-implemented method for video security, the method comprising:

- monitoring an area with a camera;
- capturing, by the camera, live video to provide one or more live video streams;
- generating, by a processor using a recognition neural network, a rich feature embedding for identity information and non-identity information for each of the one or more live video streams, the generating further comprising performing disentanglement by:
  - on an input side, preparing pairs of images from the one or more live video stream, the pairs of images including a first image with a comparatively small head pose change and a second image with a comparatively large head pose change; and
  - on a network structure side, preparing two branches, the branches including a first identity-related branch and a second head pose related branch, and being configured for self-reconstruction and cross-reconstruction;
- predicting, using a synthesization network, a 3-Dimensional (3D) facial shape S from an image I from the pairs of images where $S \in \mathbb{R}^{3 \times N}$ are 3D coordinates of a total N vertexes, wherein a 3D Morphable Model (3DMM) is applied and p is a parameter configured to control both a rigid affine transformation and a non-rigid facial deformation from a 3D mean shape to an instance shape to calculate a 3D facial shape as follows:

$$S(p) = sR(\overline{S} + \Phi_{id}\alpha_{id} + \Phi_{exp}\alpha_{exp}) + T$$

where p={s, R, T, $\alpha_{id}$, $\alpha_{exp}$} including scale s, rotation R, translation T, identity coefficient $\alpha_{id}$ and expression coefficient $\alpha_{exp}$, wherein an eigen basis $\Phi_m$ and $\Phi_{exp}$ are offline learned using 3D face scans to model an identity and expression subspace, respectively;

- generating, by the processor using a Siamese reconstruction network, one or more pose-invariant features by employing the rich feature embedding for identity information and non-identity information;
- identifying, by the processor, a user based on the predicting and the one or more pose-invariant features; and
- controlling, by the processor, an operation of a processor-based machine to change a state of the processor-based machine, responsive to the identified user in the one or more live video streams.

20. A computer program product for video security, the computer program product comprising a non-transitory computer readable storage medium having program instructions embodied therewith, the program instructions executable by a computer to cause the computer to perform a method comprising:

- monitoring an area with a camera;
- capturing, by the camera, live video to provide one or more live video streams;
- generating, by a processor using a recognition neural network, a rich feature embedding for identity information and non-identity information for each of the one or more live video streams, the generating further comprising performing disentanglement by:
  - on an input side, preparing pairs of images from the one or more live video stream, the pairs of images including a first image with a comparatively small head pose change and a second image with a comparatively large head pose change; and
  - on a network structure side, preparing two branches, the branches including a first identity-related branch and a second head pose related branch, and being configured for self-reconstruction and cross-reconstruction;
- predicting, using a synthesization network, a 3-Dimensional (3D) facial shape S from an image I from the pairs of images where $S \in \mathbb{R}^{3 \times N}$ are 3D coordinates of a total N vertexes, wherein a 3D Morphable Model (3DMM) is applied and p is a parameter configured to control both a rigid affine transformation and a non-rigid facial deformation from a 3D mean shape to an instance shape to calculate a 3D facial shape as follows:

$$S(p) = sR(\overline{S} + \Phi_{id}\alpha_{id} + \Phi_{exp}\alpha_{exp}) + T$$

where p={s, R, T, $\alpha_{id}$, $\alpha_{exp}$} including scale s, rotation R, translation T, identity coefficient $\alpha_{id}$ and expression coefficient $\alpha_{exp}$, wherein an eigen basis $\Phi_{id}$ and $\Phi_{exp}$ are offline learned using 3D face scans to model an identity and expression subspace, respectively;

- generating, by the processor using a Siamese reconstruction network, one or more pose-invariant features by employing the rich feature embedding for identity information and non-identity information;
- identifying, by the processor, a user by employing based on the predicting and the one or more pose-invariant features; and
- controlling, by the processor, an operation of a processor-based machine to change a state of the processor-based machine, responsive to the identified user in the live video stream.

* * * * *